United States Patent Office 3,539,325
Patented Nov. 10, 1970

3,539,325
FOLIAR FEEDING OF PINEAPPLE
Donald C. Young, Fullerton, and Saburo Hashimoto, Yorba Linda, Calif., assignors to Union Oil Company of California, Los Angeles, Calif., a corporation of California
No Drawing. Filed Jan. 8, 1968, Ser. No. 696,099
Int. Cl. C05c 1/00
U.S. Cl. 71—1     6 Claims

ABSTRACT OF THE DISCLOSURE

The invention comprises the application of concentrated ammonium nitrate solutions to the foliage of pineapple plants. The solutions are applied at dosages of from 5 to 90 pounds of nitrogen per acre using solutions having a concentration of at least 10 weight percent nitrogen. Surprisingly, it has been found that the use of the aforementioned highly concentrated ammonium nitrate solutions does not result in increased osmotic burning of the foliage of the pineapple plants, but rather, the rate of osmotic burning of the foliage decreases with the increasing concentration of the solutions. The solutions optionally also include a soluble iron salt such as iron sufate, iron nitrate, etc., in amounts from about 0.5 to about 10 weight percent calculated as iron. The added salts supply the iron requirements of the plant to avoid chlorosis and, suprisingly, have been observed to further decrease the rate of osmotic burning of the applied solutions. The solutions are applied with normal agronomical practice; generally, frequent applications are made during the growing season to supply from 400 to about 600 pounds nitrogen per acre per year.

DESCRIPTION OF THE INVENTION

The invention relates to a method for the fertilization of pineapple and in particular relates to the use of concentrated ammonium nitrate solutions as foliar sprays for such fertilization.

The agronomy of pineapple is unique in that the pineapple plant is commonly fertilized with the use of foliar sprays rather than the fertilization by absorption from the soil by the roots of the plants. The fertilization of pineapple is commonly performed with dilute solutions of urea which optionally contain a soluble iron salt or chelate to supply the iron requirements to avoid chlorosis of the pineapple plant. Recent improvements in the agronomy have been directed to the substitution of ammonium nitrate for the urea solutions since the prolonged use of urea is believed to contribute to chronic chlorosis and increased disease susceptibility of the pineapple plant. Substitution of ammonium nitrate has been observed to decrease the chlorosis and result in a more vigorous plant that is more resistant to fungus diseases.

The application of ammonium nitrate solutions to pineapple has heretofore been limited to the use of very dilute solutions since prior studies have indicated that ammonium nitrate has a greater tendency to cause osmotic burn than urea. Because of this generally held belief, the maximum concentration for the foliar application of ammonium nitrate solutions has been about 3 to 5 weight percent of the nitrate salt. Economical agronomical practice requires that the application rate of nitrogen be at least 15 pounds per acre per application and, accordingly, the use of the aforementioned dilutions of ammonium nitrate have heretofore required the application of about 500 pounds of total solution per acre. The use of such dilute solutions has severely limited the utilization of ammonium nitrate for pineapple fertilization.

Contrary to the generally held belief we have now found that osmotic burn of pineapple does not increase with increasing concentration of the applied nutrient solution. Instead, we have found, in repeated applications, that the degree of osmotic burn is more severe with the more dilute solutions and that the use of solutions of concentrations greater than about 10 weight percent nitrogen and preferably greater than about 15 weight percent nitrogen permit the application of high dosages of nitrogen per acre without encountering objectionable osmotic burn. While not wishing to be bound by any unproven theory for this behavior, it is believed that the highly dilute solutions wash the nutrient solute into the basal portions of the pineapple leaves, thereby raising the solute concentration and causing osmotic burning of these highly sensitive areas of the leaf tissue. The use of the concentrated solutions, it is believed, prevents the washing of the solute into the sensitive basal portion of the leaf since the limited amount of water in these concentrated solutions is rapidly evaporated and the solute is crystallized and deposited on the entire leaf tissue by the evaporation. Observations of treated pineapple plants have tended to confirm this theory in that the leaves of the treated plants have a detectable coating of ammonium nitrate crystals over their entire surface. This coating has not been observed when solutions of less than about 10 weight percent ammonium nitrate concentration have been applied to the plant.

Our invention, therefore, comprises the application of ammonium nitrate solutions having concentrations of at least 10, preferably at least 15 and, most preferably, at least about 18 weight percent calculated as nitrogen. The maximum content of the solution can be the limit of its solubility in water, i.e., about 20 weight percent nitrogne (57 weight percent ammonium nitrate) for solubility at 5.5° C. When the lowest ambient temperature to which the solutions are exposed is greater than 5.5° C. it is possible to use solutions having higher ammonium nitrate contents, e.g., up to about 25 percent nitrogen at temperatures of about 70° F.

The solutions are applied to the foliage of the pineapple plants by spraying the solutions with a conventional ground rig applicator or by aerial application to supply a sufficient amount of the solution that will provide from 5 to about 50 pounds nitrogen per acre; preferably from about 10 to about 30 pounds nitrogen per acre.

In preferred embodiments, the solution can also contain from about 1 to about 40, preferably from about 5 to about 15 weight percent of a water soluble iron salt such as ferrous nitrate, ferric nitrate, ferrous sulfate, ferric sulfate, iron halides such as ferrous chloride, ferric fluoride, ferric chloride, soluble ferrous and ferric salts of $C_1$–$C_6$ carboxylic acids such as ferrous acetate, ferric citrate, ferrous and ferric lactate, ferric maleate, etc. The concentration of the iron salt in the solution can be adjusted to provide from about 0.5 to about 10, preferably from about 1 to about 5 weight percent iron per acre.

The effect of ammonium nitrate solutions on the degree of osmotic burn of pineapple plants was observed in a test procedure wherein the solutions were applied to randomized plots of pineapple plants to which the ammonium nitrate was applied in varied dosages and concentrations, with and without the added iron salt. Each application was repeated at least 4 times and the plot was rated for degree of osmotic burn by observing and recording the percent of the area of the leaf tissue exhibiting a detectable osmotic burn.

The observations were correlated as a burn index rating which was a logarithmic function of the area of osmotic burn to provide a rating which was relatively more sensitive to slight degrees of osmotic burn. The burn index is related to the area of plant tissue exhibiting osmotic burn by the following equation:

$$\text{Burn Index} = 1.2(\log A + 2)$$

wherein A is the present area of plant tissue exhibiting osmotic burn.

The data obtained from the tests were correlated by statistical evaluation using a computer program for the analysis of variance. Variables showing a correlation of a significance of 99.9 percent or greater were considered to be primary effects. Variables showing a correlation of significance of 95–99 percent were considered to be secondary or minor effects.

The test materials were applied to contiguous, randomized plots containing two rows of pineapple plants per plot. The solutions were applied with a spray device that produced a constant rate of spray and the dosage rate was controlled by varying the rate of travel of the spray rig through the plot. The check plots were treated with 15 gallons of water under identical conditions. The tests were repeated through a range of conditions of temperatures from 68° to 85° F., relative humidities from 50 to 85 percent and wind velocities from 1.5 to 7 miles per hour.

The test plots were evaluated approximately 10 days after application of the solutions. The inspection was made at the center areas of each plot using a numerical rating scale of 1 to 5 wherein 1 represented no detectable damage and 5 represented the maximum osmotic burn observed. Random leaf samples were taken from the plots and the average area of osmotic burn was measured to determine the burn index ratings.

The test data were statistically evaluated by a method of analysis of variance and covariance and the data of 99.9 percent confidence level or greater the presented in the following tables as the average of the values collected during five separate test applications.

The effect of ammonium nitrate concentration on the burn index is set forth in Table 1. This table demonstrates that an inverse relationship exists between the burn index and the concentration of the ammonium nitrate solution used in the foliar feeding. The data presented were collected over the dosage rates of from 10 to 40 pounds of nitrogen per acre and demonstrate that within this dosage that the solutions of the highest concentrations exhibit the lowest osmotic burn.

TABLE 1

| Solution concentration | | Osmotic burn index |
|---|---|---|
| $NH_4NO_3$, percent | N, percent | |
| 8.5 | 3 | 2.4 |
| 28.5 | 10 | 2.2 |
| 57.0 | 20 | 1.4 |

Table 2 presents the variation of burn index with the absolute rate of ammonium nitrate applied to the test plots. These data are presented for the application of the concentrated ammonium nitrate solution having 20 weight percent nitrogen and illustrate that within the range of the 5 to 40 gallons per acre concentrated solution a direct relationship exists between the total dosage and the burn index of the plant.

TABLE 2

| Dosage per acre | | Osmotic burn index |
|---|---|---|
| Gallons $NH_4NO_3$ | Pounds N | |
| 0 | 0 | 1.8 |
| 5 | 11 | 1.4 |
| 10 | 22 | 1.6 |
| 15 | 33 | 1.9 |
| 20 | 44 | 2.0 |
| 40 | 88 | 3.5 |

The effect of iron salts on the burning tendency of ammonium nitrate was evaluated by the use of ferrous sulfate and ferric nitrate in the ammonium nitrate solution. The data presented in Table 3 show the variation with burn index with the dosage of gallons per acre of the ammonium nitrate solution applied to the plants and the effect of the addition of sufficient quantities of the aforementioned iron salts to provide about 2 pounds per acre of iron in the dissolved iron salts. These data demonstrate that the incorporation of iron in the ammonium nitrate solutions reduces the burn index observed with application at any constant rate of ammonium nitrate. Significant decreases in the burn index are observed in the applications of the high dosages of ammonium nitrate solution, i.e., greater than about 20 gallons per acre of the 20 weight percent nitrogen ammonium nitrate solution, corresponding to the application of 44 pounds nitrogen per acre.

TABLE 3

| Dosage per acre | | | Osmotic burn index |
|---|---|---|---|
| Gallons $NH_4NO_3$ | Pounds N | Pounds iron | |
| 0 | 0 | 0 | 1.5 |
| 10 | 22 | 0 | 1.5 |
| 10 | 22 | 2 | 1.2 |
| 15 | 33 | 0 | 2.0 |
| 15 | 33 | 2 | 2.0 |
| 20 | 44 | 0 | 1.4 |
| 20 | 44 | 2 | 1.1 |
| 40 | 88 | 0 | 3.5 |
| 40 | 88 | 2 | 2.8 |

Table 4 illustrates the effect of varied pH on the burn index and the data set forth in this table demonstrate that the burn index is relatively uneffected by acidic pH values of the ammonium nitrate solution since the greatest change in the burn index was the increase of about 0.5 unit in changing the pH from 6 to 0.5 by the addition thereto of sufficient nitric acid to lower the pH to the indicated value. The elevation of the pH of the solution to a value of about 8.0 by the addition of disodium orthophosphate and citric acid revealed a similar insensitivity of the burn index to the pH of the solution.

TABLE 4

| Dosage per acre | | | Osmotic burn index |
|---|---|---|---|
| Gallons $NH_4NO_3$ | Pounds N | Solution pH | |
| Water | 0 | 0.5 | 2.9 |
| Do | 0 | 6.0 | 2.3 |
| 10 | 22 | 0.5 | 2.5 |
| 10 | 22 | 6.0 | 2.3 |
| 15 | 33 | 0.5 | 3.0 |
| 15 | 33 | 6.0 | 2.5 |
| 20 | 44 | 0.5 | 3.0 |
| 20 | 44 | 6.0 | 2.8 |
| 40 | 88 | 0.5 | 4.0 |
| 40 | 88 | 6.0 | 3.9 |

The foliar sprays can be applied by any conventional technique such as the application with commercial ground rig sprayers with extended booms capable of applying the solution to multiple rows per pass and capable of delivering a constant volume spray at the indicated dosages. Similarly, the use of the highly concentrated solutions permits the use of aerial application by permitting the application of up to 60 pounds nitrogen per acre without using greater than about 30 gallons of total spray per acre. Frequent applications of the solutions follow the normal agronomical practice to provide a total of 350 to about 650 pounds nitrogen per acre per year.

The invention has been illustrated by reference to experiments which demonstrate a mode of practice and illustrate the results obtainable thereby. It is not intended that the invention be unduly limited by this exemplified disclosure but rather that the invention be defined by the steps and reagents and their obvious equivalents set forth in the following claims.

We claim:

1. The method for foliar fertilization of pineapple that comprises applying to the foliage of the pineapple plants an aqueous solution containing from 10 to about 25 weight percent nitrogen as ammonium nitrate at a dosage from 5 to 90 pounds nitrogen per acre.

2. The method of claim 1 wherein said solution contains from 15 to 20 weight percent nitrogen as ammonium nitrate.

3. The application of claim 1 wherein said solution is applied to provide a total dosage of from 10 to 50 pounds nitrogen per acre.

4. The method of claim 1 wherein said solution contains 18 to 20 weight percent nitrogen as ammonium nitrate.

5. The method of claim 1 wherein said solution also contains from 1 to 40 weight percent of a water soluble iron salt.

6. The method of claim 1 wherein said solution also contains from 5 to about 15 weight percent of a water soluble iron salt.

References Cited

UNITED STATES PATENTS 3,174,844   5/1965   Bridges et al. _____ 71—16

REUBEN FRIEDMAN, Primary Examiner

R. BARNES, Assistant Examiner

U.S. Cl. X.R.

47—58; 71—59